Feb. 4, 1969 C. J. TWINE 3,425,675
BURNER TUBE ASSEMBLY FOR HEAT TREATING FURNACE
Filed Dec. 14, 1966
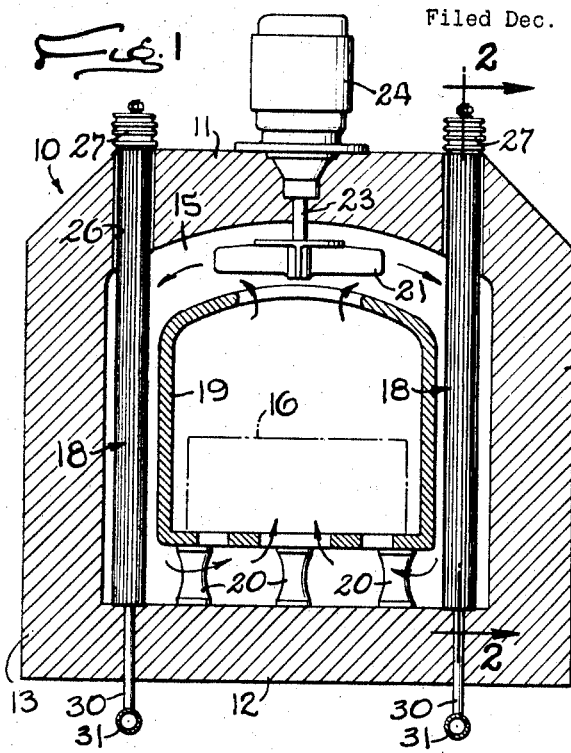
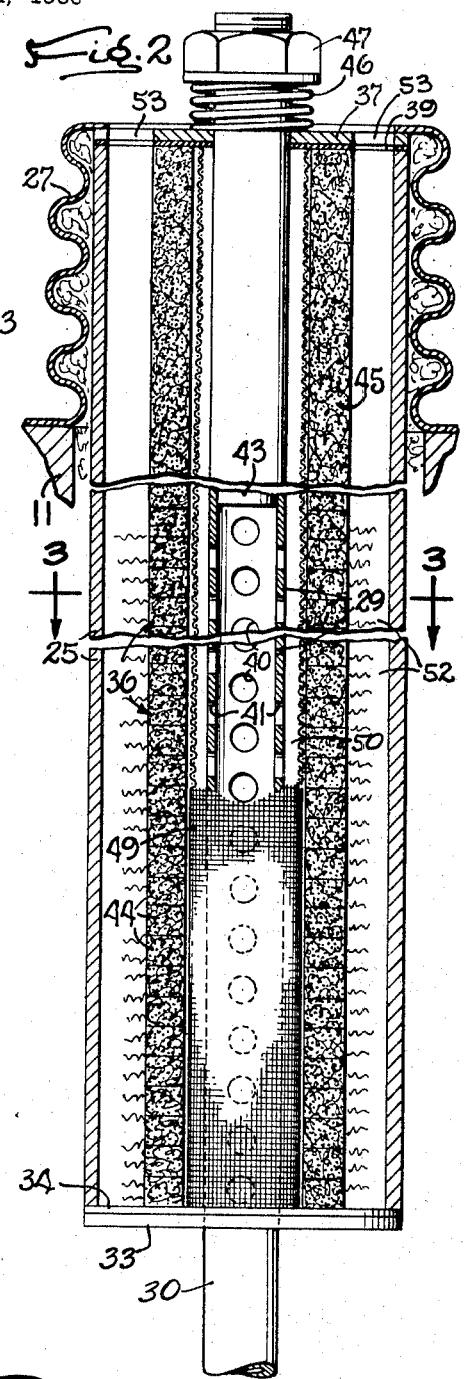
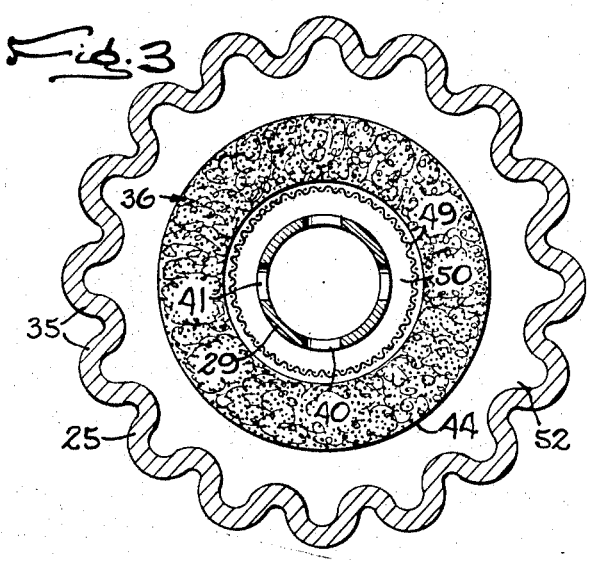
INVENTOR
Charles J. Twine
by Wolf, Hubbard, Voit & Osann
ATTORNEY United States Patent Office 3,425,675
Patented Feb. 4, 1969

3,425,675
BURNER TUBE ASSEMBLY FOR HEAT
TREATING FURNACE
Charles J. Twine, Rockford, Ill., assignor, by mesne assignments, to Alco Standard Corporation, Philadelphia, Pa., a corporation of Ohio
Filed Dec. 14, 1966, Ser. No. 601,629
U.S. Cl. 263—41         5 Claims
Int. Cl. F23d 13/12; F27b 5/00

ABSTRACT OF THE DISCLOSURE

A radiant burner tube assembly for a heat treating furnace includes an outer, non-porous ceramic tube located within the furnace chamber, a series of rings made of porous ceramic fiber material and stacked end-to-end within the tube to form a sleeve, and a fuel delivery pipe telescoped into the sleeve to supply a combustible mixture of gas and air to the inner surface of the sleeve. The fuel mixture is passed uniformly through the interstices of the fiber material of the sleeve and is ignited on the outer surface of the sleeve with substantially flameless combustion to heat the outer surface to a bright radiant glow and thereby produce evenly distributed radiant waves of uniform intensity for heating the outer tube which, in turn, radiates energy uniformly along its length to heat the furnace chamber. A tubular screen is telescoped over the delivery pipe and into the sleeve to balance along the length of the latter the pressure of the fuel mixture supplied to the sleeve and to prevent combustion from occurring inside of the sleeve.

This invention relates to a burner tube assembly for a heat treating furnace and, more particularly, to an assembly of the type in which an elongated tube disposed within the furnace chamber is heated by a combustible fuel mixture of gas and air flowing through the tube and radiates energy waves for heating the chamber.

The primary object of the invention is to achieve more uniform radiation along the entire length of the tube and to transfer more of the heat energy of the fuel to the chamber than in prior furnaces of the same general type.

A more detailed object is to pass the fuel mixture uniformly through a porous sleeve of material telescoped within the tube and to ignite the mixture on the outer surface of the sleeve thereby to produce evenly distributed energy waves of uniformly high intensity for heating the tube.

A further object is to heat the tube by the radiant energy directed from the sleeve and, at the same time, by the products of combustion of the ignited fuel.

Another object is to pass the mixture through a sleeve made of flexible porous ceramic fiber and to heat the outer surface of the sleeve to a bright radiant glow.

Still another object is to provide a tubular screen within the sleeve to balance the pressure of the fuel mixture evenly along the length of the sleeve and to prevent the mixture from igniting on the inside of the sleeve.

Other objects and advantages of the invention will become apparent from the following detailed description taken in connection with the accompanying drawings, in which:

FIG. 1 is a transverse sectional view of a furnace having burner tube assemblies embodying the novel features of the present invention.

FIG. 2 is an enlarged fragmentary cross-section taken substantially along the line 2—2 of FIG. 1.

FIG. 3 is a cross-section taken substantially along the line 3—3 of FIG. 2.

As shown in the drawings for purposes of illustration, the invention is embodied in a heat treating furnace 10 formed with top, bottom and side walls 11, 12 and 13 defining a chamber 15 in which workpieces 16 are heated by a series of burner tube assemblies 18 radiating heat energy waves. In a furnace of this type, the workpieces are placed within a box-like baffle 19 which is disposed within the chamber and rests on pillars 20 upstanding from the bottom wall 12 so as to be spaced from all of the furnace walls. During treating of the workpieces, the atmosphere within the chamber is circulated across the burner tube assemblies, through the baffle and across the workpieces by a fan 21 mounted on the lower end of a vertical shaft 23 projecting downwardly through the top wall 11 and driven by an electric motor 24.

Herein, the radiant burner assemblies 18 include elongated outer tubes 25 disposed between the side walls of the baffle 19 and the furnace side walls 13 and extending vertically from the bottom wall 12 to the top wall 11. The upper end of each tube projects upwardly through a hole 26 formed in the top wall and is connected to the latter by a metallic bellows 27 which seals the hole and allows the tube to expand when heated.

Preferably, each tube 25 is made of non-porous refractory ceramic material and is heated by a combustible mixture of gas and air premixed in optimum quantities and supplied under pressure to the tube through a fuel delivery pipe 29 (FIGS. 2 and 3) formed with an inlet 30 at its lower end communicating with a manifold 31 (FIG. 1) disposed beneath the bottom wall 12 of the furnace 10. Each delivery pipe 29 extends upwardly from the manifold, through the bottom wall of the furnace and then into the tube 25 through a cover plate 33 (FIG. 2) fastened to the lower end of the tube. A ceramic washer 34 encircling the pipe and sandwiched between the lower end of the tube and the cover plate establishes a gas-tight seal at the bottom of the tube.

As the fuel mixture is supplied to the pipes 29, the tubes 25 are heated to a very high temperature and radiate heat energy waves for heating the workpieces 16. The outer surfaces of the tubes are corrugated vertically as indicated at 35 in FIG. 3 to provide a large radiating area for a tube of given diameter.

The present invention contemplates the novel use of a member 36 through which the fuel mixture is passed for combustion on the surface of the member adjacent the furnace chamber 15 to heat the surface to a bright radiant glow so that the thermal energy of the fuel is transferred efficiently to the chamber and, at the same time, the heat radiating into the chamber is of uniform intensity from the top to the bottom of the chamber. In one specific example of the invention, the member 36 is a sleeve of porous refractory material telescoped into the tube 25 and over the delivery pipe 29 in a novel manner such that the mixture of gas and air flowing through the pipe is passed uniformly through the interstices of the material of the sleeve. The mixture, after passing through the sleeve 36, ignites with substantially flameless combustion on the outer surface of the sleeve along the length of the same to produce evenly distributed radiant waves of uniform intensity for heating the tube which, in turn, radiates energy uniformly along its length to heat the chamber 15. At the same time, the products of combustion resulting from the ignition of the mixture flow upwardly between the sleeve and the radiant tube and heat the latter to still higher temperatures thereby causing a very high proportion of the total energy generated by the combustion of the fuel to be transferred first to the radiant tube and then to the chamber.

In the present instance, each gas delivery pipe 29 extends upwardly through the entire length of the tube 25 and projects through a top cover plate 37 and a ceramic washer 39 sandwiched between the upper end of the tube and the upper end of the metallic bellows 27. The gas and air mixture flowing through the pipe from the inlet 30 is delivered to the outside of the pipe through sets of radially extending and axially spaced outlets 40 and 41 formed through the walls of the portion of the pipe disposed below the top wall 11 of the furnace 10. To promote even distribution of the mixture around the circumference and along the length of the pipe, the outlets of each set extend through the pipe at diametrically opposed points, and the outlets 40 of one set are angularly spaced and axially staggered relative to the outlets 41 of the other set. While the outlets are shown as equally spaced and of equal diameter, it is apparent that other arrangements may be used to obtain a uniform distribution of the mixture along the length of the pipe. The upper end of the pipe is closed by an internal plug 43 (FIG. 2) and thus all of the mixture flowing from the inlet is distributed in substantially equal quantities around and along the outside of the delivery pipe through the outlets 40 and 41.

Preferably, the sleeve 36 is made of a relatively flexible ceramic fiber felt which is porous and thus permeable to gas but which also is capable of withstanding extremely high temperatures. An example of a suitable material is sold by the Johns-Manville Company under the trade designation Dyna-Flex. To facilitate manufacture, the sleeve is formed by a plurality of cylindrical rings 44 which are stacked end-to-end within the radiant tube 25 and are spaced radially from the delivery pipe 29 to allow the fuel mixture to flow freely from the outlets 40 and 41. The rings are held in stacked relationship by a tubular spacer 45 of rigid ceramic material telescoped over the pipe and disposed between the upper ring and the top cover plate 37. A coil spring 46 contracted between the top plate and a nut 47 threaded on the upper end of the delivery pipe urges the spacer against the rings but allows the latter to expand when heated. To help maintain the radial spacing between the rings and the pipe 29, a porous sleeve herein in the form of a twenty mesh steel screen cylinder 49 is telescoped into the rings and over the pipe. The screen 49 also serves the important function of balancing the pressure of the fuel mixture along the length of the sleeve 36 and thereby causes the pressure of the mixture delivered to the sleeve to be substantially uniform from one end of the sleeve to the other.

After the mixture of gas and air flows uniformly out of the outlets 40 and 41 and alongside the pipe 29, it passes first through the screen 49 for pressure equalization and then passes through the material of the sleeve 36 due to the passageways formed by the interstices in the porous ceramic fiber. The mixture is ignited on the outer cylindrical surface of the ceramic sleeve and burns with substantially flameless combustion, as opposed to distinct flames, to heat the sleeve to a reddish incandescent glow. The combustion is substantially flameless because an optimum quantity of air is premixed with the gas and because the mixture is preheated as it passes through the hot sleeve 36. As a result, the gas does not have to seek additional oxygen and combustion occurs exactly on the outer surface of the sleeve without producing a shooting flame. Such flameless combustion heats the sleeve to a higher temperature than a flame spaced from the outer surface and thus results in more efficient transfer of the thermal energy of the fuel.

The temperature of the sleeve 36 raises uniformly around its circumference and throughout its entire length thereby resulting in the radiation of evenly distributed heat energy waves from the sleeve. The radiant energy heats the outer tube 25 evenly along its length so that the intensity of the heat radiating from the tube into the chamber 15 is extremely uniform from the bottom to the top of the chamber.

In addition to balancing the pressure of the fuel mixture and maintaining the sleeve 36 spaced radially from the delivery pipe 29, the screen cylinder 49 insures that the fuel mixture will not ignite in the space or chamber 50 between the outer surface of the pipe and the inner surface of the sleeve. The screen is cooled by the incoming mixture passing from the pipe into the sleeve and thus any flame attempting to pass reversely from the outer surface of the sleeve toward the inner surface will be quenched by the cooled screen. With this arrangement, the screen prevents combustion of the mixture within the chamber 50 even through the flame may tend to travel inwardly should the velocity of the mixture be less than its combustion rate.

To transfer a still larger proportion of the thermal energy generated by the combustion of the fuel mixture to the furnace chamber 15, the sleeve 36 is spaced radially inwardly from the outer radiant tube 25 thereby to define an annular passage 52 through which the products of combustion or hot gases created by the burning of the mixture may pass upwardly along the inner surface of the tube. The upwardly flowing hot gases further raise the temperature of the tube before exhausting out of ports 53 (FIG. 2) formed in the upper cover plate 37. Because the gases are confined between the tube and the sleeve, they cannot escape into the chamber 15 to contaminate the atmosphere circulated across the workpieces 16.

From the foregoing, it will be apparent that the radiant burner assembly of the present invention results in an extremely uniform distribution of radiant energy to the furnace chamber 15. Moreover, by varying the positioning of the outlets 40 and 41 in the delivery pipe 29, preferential heat radiation along different lengths of the tube 25 may be incorporated into the assembly for specialized applications.

I claim as my invention:

1. In a heat treating furnace, the combination of, a walled enclosure defining a chamber, a radiant burner tube assembly disposed within said chamber and including an elongated fuel delivery pipe having an inlet for receiving a gaseous fuel mixture, axially and angularly spaced outlets extending through the walls of said pipe and communicating with said inlet to distribute the fuel mixture to the outside of the pipe, a sleeve made of flexible porous ceramic fiber telescoped over and spaced radially from said pipe and having interstices defining a series of passageways extending between the inner and outer surfaces of the sleeve, said passageways being disposed around and along the length of the sleeve for passage of all of the fuel mixture in its original uncombusted state from the delivery pipe through the walls of the sleeve for substantially flameless combustion on the outer surface thereof to cause uniform radiation of heat waves from the sleeve, a tubular mesh screen telescoped into said sleeve and over said delivery pipe to balance the pressure of the fuel mixture flowing from said delivery pipe to said sleeve along the length of the latter and to prevent combustion adjacent the inner surface of the sleeve, and an outer tube of substantially non-porous refractory material radially spaced from and surrounding said sleeve and exposed to said chamber to be heated by said waves and to radiate heat to the chamber.

2. In a heat treating furnace, the combination of, a walled enclosure defining a chamber, a radiant burner tube assembly disposed within said chamber and including an elongated fuel delivery pipe having an inlet for receiving a gaseous fuel mixture, axially and angularly spaced outlets extending through the walls of said pipe and communicating with said inlet to distribute the fuel mixture to the outside of the pipe, a first sleeve of porous ceramic material telescoped over and spaced radially from said pipe and having interstices defining a series of passageways extending between the inner and outer surfaces of the sleeve, said passageways being disposed around and along the length of the sleeve for passage of all of the fuel mixture in its original uncombusted state from the delivery pipe through the walls of the sleeve for substantially flameless combustion on the outer surface thereof to cause uniform radiation of heat waves from the sleeve, a second porous sleeve telescoped into said first sleeve and over said delivery pipe to balance the pressure of the fuel mixture flowing from said delivery pipe to said first sleeve along the length of the latter and to prevent combustion adjacent the inner surface of the first sleeve, and an outer tube of substantially non-porous refractory material radially spaced from and surrounding said first sleeve and exposed to said chamber to be heated by said waves and to radiate heat to the chamber.

3. A heat treating furnace as defined in claim 2 in which said second sleeve is a tubular mesh screen.

4. The combination defined in claim 1 in which said sleeve is formed by a plurality of flexible porous ceramic fiber rings stacked end-to-end within said outer tube.

5. The combination defined in claim 1 in which said outer tube completely encloses said sleeve within said chamber and includes an exhaust leading out of said chamber thereby to confine the products of combustion of the mixture between the outer tube and the sleeve and to prevent their escape to said chamber.

References Cited

UNITED STATES PATENTS

| | | |
|---|---|---|
| 444,485 | 1/1891 | Reed. |
| 1,213,470 | 1/1917 | Finlay. |
| 2,822,798 | 2/1958 | Ipsen _____ 263—41 X |
| 3,087,041 | 4/1963 | Vonk. |
| 3,339,539 | 9/1967 | Fannon et al. |

FOREIGN PATENTS 905,529   9/1962   Great Britain.

FREDERICK L. MATTESON, JR., *Primary Examiner.*

EDWARD G. FAVORS, *Assistant Examiner.*

U.S. CL. X. R.

431—328